United States Patent [19]

Aurouet et al.

[11] Patent Number: 4,812,013

[45] Date of Patent: Mar. 14, 1989

[54] PROCESS FOR UTILIZING LIGHT RADIATION WITH THE AID OF FLUORESCENT OPTICAL FIBRES AND FUNCTIONAL DEVICES AND APPARATUS USING SAID PROCESS

[76] Inventors: Claude Aurouet, Saint Michel sur Orge; Henry Blumenfeld, Gif sur Yvette; Michel Bourdinaud, Bures sur Yvette; Jean Calvet, Paris; Jean-Claude Cavan, Vincennes; Joao Meyer, Paris; Jean-Claude Thevenin, Velizy, all of France

[21] Appl. No.: 136,773

[22] Filed: Dec. 22, 1987

Related U.S. Application Data

[62] Division of Ser. No. 806,610, Dec. 9, 1985, Pat. No. 4,753,512.

[30] Foreign Application Priority Data

Dec. 10, 1984 [FR] France .................................. 84 18831

[51] Int. Cl.[4] .......................... G02B 6/02; G02B 6/00; G01T 1/20; G01F 23/00
[52] U.S. Cl. .................. 350/96.29; 250/368; 250/458.1; 350/96.10
[58] Field of Search ............................ 350/96.15, 96.29; 250/368, 458.1, 461.1

[56] References Cited

U.S. PATENT DOCUMENTS

| | | | |
|---|---|---|---|
| 3,274,392 | 8/1963 | Harling | 250/227 |
| 3,317,738 | 12/1964 | Peipenbrink et al. | 250/227 |
| 3,567,985 | 3/1971 | Goodman | 313/70 |
| 3,569,933 | 3/1971 | Longenecker et al. | 340/79 |
| 3,934,148 | 1/1976 | Collins | 250/258 |
| 4,023,887 | 5/1977 | Speers | 350/96.29 |
| 4,403,826 | 9/1983 | Presby | 350/96.30 |
| 4,425,907 | 1/1984 | Younghouse | 126/439 |
| 4,753,512 | 6/1988 | Aurouet et al. | 350/96.29 |

FOREIGN PATENT DOCUMENTS

| | | |
|---|---|---|
| 0022198 | 6/1980 | European Pat. Off. . |
| 0074807 | 9/1982 | European Pat. Off. . |
| 2365814 | 9/1977 | France . |
| 5776466 | 10/1980 | Japan . |
| 1274128 | 5/1972 | United Kingdom . |

Primary Examiner—William L. Sikes
Assistant Examiner—Akm E. Ullah
Attorney, Agent, or Firm—Kerkam, Stowell, Kondracki & Clarke

[57] ABSTRACT

The process utilizes the fact that fluorescent optical fibres can be laterally excited by light radiation by supplying concentrated light signals to their ends.

The invention proposes applying this process to producing indicating, control, logic function measurement and similar apparatus, as well as for producing solar collectors for the direct generation of electricity.

3 Claims, 4 Drawing Sheets

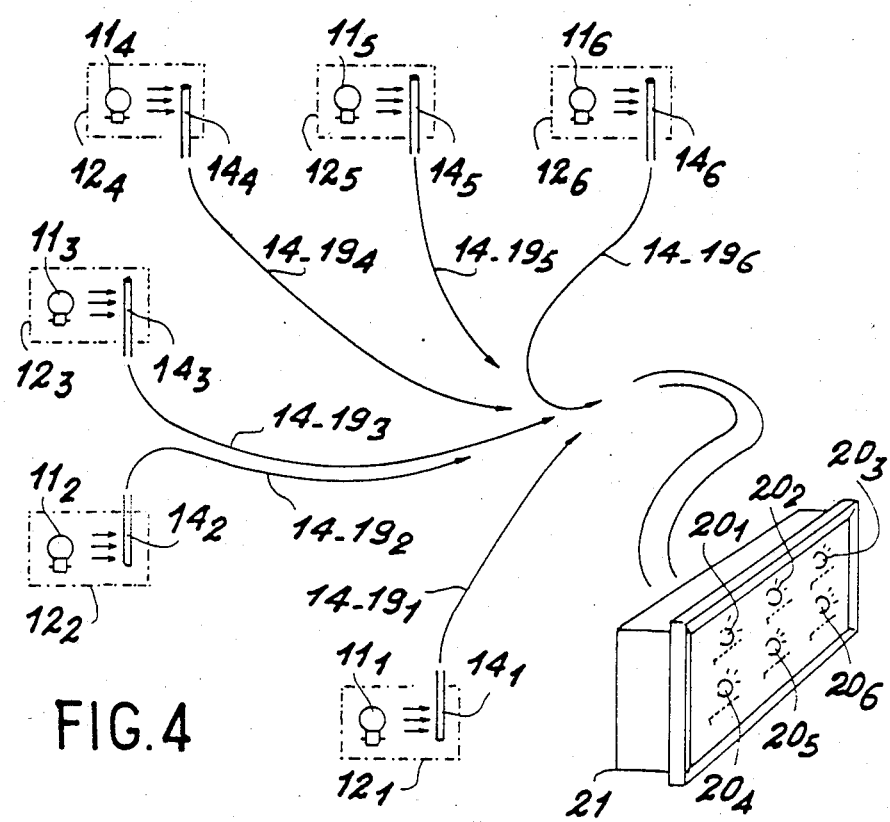
FIG.4
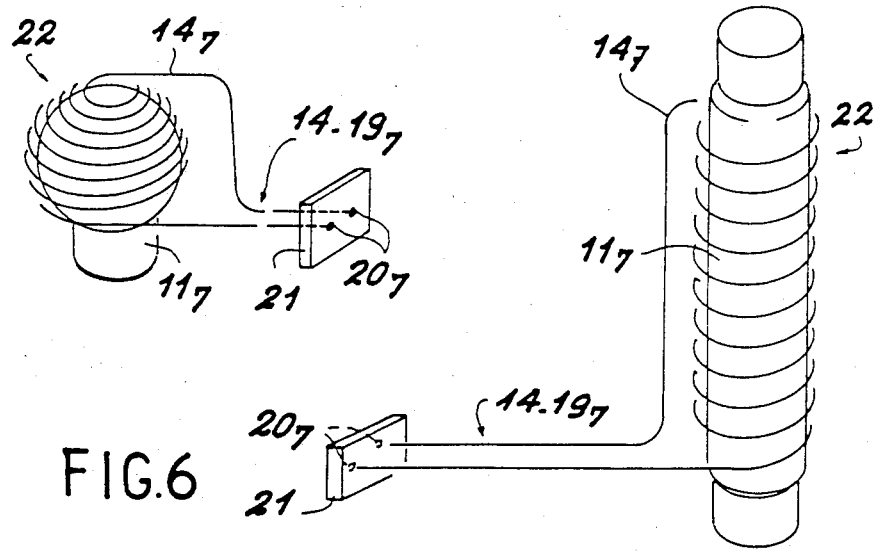
FIG.5
FIG.6

PROCESS FOR UTILIZING LIGHT RADIATION WITH THE AID OF FLUORESCENT OPTICAL FIBRES AND FUNCTIONAL DEVICES AND APPARATUS USING SAID PROCESS

This is a divisional of application Ser. No. 806,610, filed Dec. 9, 1985, now U.S. Pat. No. 4,753,512.

BACKGROUND OF THE INVENTION

The present invention relates to a process for utilizing light radiation with the aid of fluorescent optical fibres, as well as to functional devices and apparatus using said process and deals in general terms with technology using optical fibres. The latter has now been known for over a decade. Use is made of optical fibres, initially produced from glass, but then from different plastics materials, for conducting a light signal, introduced e.g. with the aid of a focussing optics through one end of the fibre, along said fibre to its other end.

For this purpose the fibre core made from glass or a transparent plastics material is coated with a first peripheral, transparent, optical sheath having a lower refractive index than that of the material used for producing the fibre core, so that the interface between the core and the sheath is the seat of total light reflection phenomena, thus permitting the transmission of the light along said sheath without any significant loss.

The optical fibres used in this way consequently require focussing towards one of their ends of the light signal to be transmitted, as well as a very precise geometrical positioning of said ends with respect to the optical focussing means. These constraints must be respected, because in the case of such applications, it is a question of transmitting optical informations, e.g. with a view to their subsequent processing for the purposes of intelligible communications, or for the display on display screens. This is only mentioned here for information purposes, because the present invention relates to applications completely outside that of optical light fibres with a terminal digital light information input.

Moreover, for several years, so-called scintillating optical fibres have been produced, generally from plastics material and whose core is doped with the aid of appropriate products, so that the fibre material, excited by a flux of elementary particles, isotropically retransmits or reemits into the material radiation with a wavelength $\lambda$ exceeding $\lambda_1$. Part of this radiation $\lambda_2$ is lost, but a by no means negligible proportion is trapped within the fibre and is propagated by internal reflection up to the ends of the scintillating fibre, where it is collected.

These fibres are intended for use in corpuscular physics in equipment for the detection of elementary particles and for measuring parameters linked with these particles.

In particular, a very recent apparatus is known which has scintillating plates excited by a corpuscular radiation perpendicular to said plates. On their lateral edges, said plates supply the collected light signals. These lateral edges are joined to lateral scintillating fibres, which in turn supply new light signals at their ends.

The present invention has a certain analogy with this very special type of use of scintillating optical fibres, because it is based on the finding that it is possible to laterally excite a doped optical fibre, from which the mechanical protective sheath has obviously been removed, by a radiation not only of elementary physical particles as in the case of the aforementioned apparatus, but more generally by a diffuse light radiation. Thus, it essentially differs therefrom by this type of light radiation used and consequently, as will be shown hereinafter, by the sought applications and the realizations which are consequently proposed.

Among the fibres which can be used as scintillating fibres, i.e. which can be excited by corpuscular radiation, so-called fluorescent fibres are known and a number of types thereof will be described hereinafter. They are sensitive to light radiation and more specifically also to corpuscular radiation. Hitherto they have only been used in the aforementioned equipment for the detection and measurement of quantities of physical particles.

The invention uses such laterally excited fluorescent fibres, but in interaction with light radiation in a number of novel ways.

SUMMARY OF THE INVENTION

The invention relates in general terms to a process for utilizing at least one light radiation in at least one useful space traversed by said radiation by means of at least one fluorescent optical fibre with a transparent core and sheath, wherein at a random point in said useful space part of such a fluorescent fibre is placed in a position such that it can be laterally excited by said radiation and wherein at least one of the two ends of the fibre at which a light signal corresponding to a lateral excitation thereof appears is provided with functional means, for utilizing said signal.

According to an application, the process is characterized in that the laterally excitable fibre part can be exposed to the flux of a single punctiform or point source and that the end of the fibre ensures a binary indication function of the operating or nonoperating state of said source.

According to another application, the process is characterized in that that part of the laterally excitable fibre can be exposed to the flux of a plurality of point sources and that the end of the fibre ensures an optical logic OR function of indicating the non-operating state of these sources or the operating state of at least one of them.

According to another application, the process is characterized in that the laterally excitable fibre part is wound in the form of adjacent or contiguous turns for example all around and in the vicinity of a material light source, said fibre part thus ensuring a collection function of the light flux emitted by said source and that the ends of the fibre ensure a point concentration function of the light and a point emission function of said concentrated light.

According to another application, the process is characterized in that at a random point in the useful space traversed by light radiation is positioned a panel formed by the joining together in a cylindrical surface of several fluorescent optical fibres, whose ends are juxtaposed along the extreme edges of the panel, so that the face of the panel ensures a light flux collection function and the extreme edges of the panel thus ensure a function of linear light concentration and linear emission of said concentrated light.

According to a feature of this application, this process is characterized in that said concentrated light line emission is collected with the aid of another part of the fluorescent optical fibre laterally excitable by said concentrated light emission line, the ends of said latter fibre thus ensuring a function of the second concentration of the initial flux.

According to another feature of the same application, the process is characterized in that parallel light radiation is utilized, such as solar radiation, that on a surface touched by said radiation is then placed a plurality of panels of the aforementioned type, that the light energy concentrated at the edges of said panels is then collected by a set of fluorescent optical fibres and by the ends of the fibres of said set is excited a third fluorescet optical fibre, thus ensuring a function of the third concentration of the initial radiation and that the ends of said third fibre are aassociated with means for the direct conversion of light into electricity.

According to another application, there is provided a linear light source and, facing said source and parallel thereto, a fluorescent optical fibre, the ends of said fibre being equipped with light detectors, per se known information processing means being provided for processing the informations supplied by said detectors and for thus supplying details on the variations in the light laterally exciting the fibre, said variations being caused either by defects resulting from lack of material in a band of material to be controlled passing between the linear source and fibre, or by the appearance of opaque objects in the normally free space between the linear source and the fibre.

According to another application, use is made of a polychromatic light source and to the radiation of said source is exposed a plurality of fluorescent optical fibres, each absorbing a corresponding, clearly defined wavelength due to its special doping, so that the excitation or non-excitation of each of these fibres makes it possible to ensure a spectral analysis function of said radiation.

It is apparent from what has been stated hereinbefore that there are numerous possible applications of the general process of the invention. The invention clearly also relates to numerous elementary devices making it possible to realize the invention.

Thus, the invention relates to an elementary device characterized in that it comprises a fluorescent optical fibre, means for supporting part of said fibre for placing said part in a useful space traversed by at least one light radiation to be utilized, as well as means associated with at least one end of the fibre for ensuring a function of utilizing said radiation.

The invention also relates to an elementary device characterized in that it comprises a winding with adjacent turns of a fluorescent optical fibre for forming a cylindrical surface for surrounding the light radiation source.

The invention also relates to an elementary device characterized in that it comprises several fluorescent optical fibres, which are laterally joined together to form a panel, which is to be exposed to light radiation and whose extreme edge constitute linear concentrated light outputs.

The invention also relates to an elementary device formed by the association of such a panel with a transverse fluorescent optical fibre collecting the linear concentrated light outputs of the panel.

The invention also relates to devices realised by the parallel connection of the aforementioned elementary devices. The invention also relates to devices produced by the series connection of the aforementioned elementary devices.

The invention also relates to apparatus constructed with the aid of the aforementioned devices for performing the general process of the invention and the various applications thereof, particularly those referred to hereinbefore.

In particular, the invention relates to an apparatus for indicating the operating or nonoperating state of at least one radiation source, characterized in that the means associated with the end of the fibre are indicating means mounted on an instrument panel.

Another object of the invention is a very bright point light source characterized in that it is constituted by the ends of a fibre wound in the form of adjacent turns around a light source.

The invention also relates to an apparatus which directly converts solar energy into electricity, characterized in that it has in cascade panels of joined fluorescent optical fibres and fibres for collecting concentrated energy supplied on the edges of said panels, the output ends of the final fibre being associated with photovoltaic cells.

The invention also relates to a control apparatus characterized in that it has a linear light source, a fluorescent optical fibre facing and parallel to said source, as well as photodetectors associated with the ends of said fibre, means for processing the information of a per se known nature being associated with these photodetectors for interpreting the light variations received by the fibre.

The invention also relates to an apparatus for the spectral analysis of a polychromatic radiation characterized in that it comprises a plurality of fluorescent optical fibres doped in different ways and consequently absorbing radiation of different wavelengths, per se known information processing means being asociated with the output signals of the different fibres for carrying out said spectral analysis.

BRIEF DESCRIPTION OF THE DRAWINGS

The invention is described in greater detail hereinafter relative to non-limitative embodiments and the attached drawings, wherein show:

FIG. 4 An indicating apparatus according to the invention for checking the operation or non-operation of a plurality of light sources.

FIGS. 5 and 6 The application of the invention to the production of very intense point light sources.

DETAILED DESCRIPTION OF THE PREFERRED EMBODIMENTS

Figure 1:
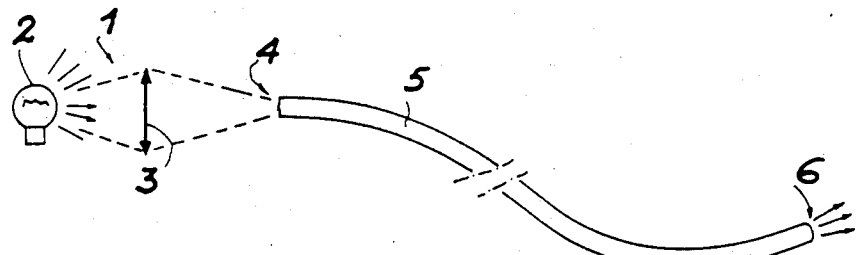
FIG. 1 A simple diagram relating to the conventional use of known optical fibres.

FIG. 1 very diagrammatically illustrates the conventional manner of using optical fibres and which consists of injecting the light flux 1 of a source 2 by means of e.g. a focussing optics 3 through the input face 4 of an optical fibre 5. Following transfer, the light energy is available on the fibre output face 6. Thus, the shaping of the input light signal requires the use of precise optical means 3 and the precise positioning of said means with respect to the input face 4 of the optical fibre.

The present invention, which also deals with treating light radiation but for other applications, aims at removing these constraints.

Figure 2:
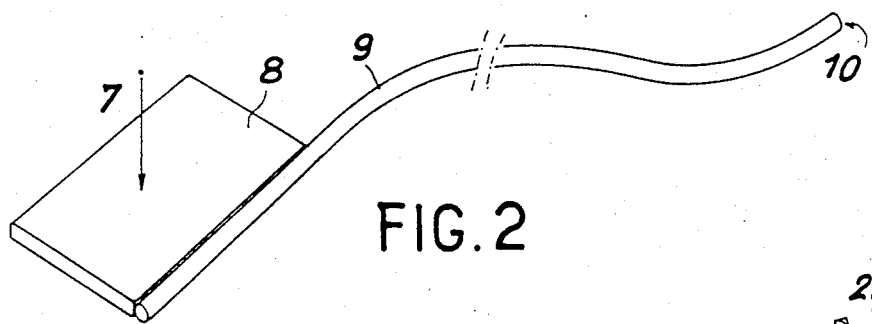
FIG. 2 A simple diagram dealing with the recent use of scintillating fibres in an apparatus for the detection and measurement of elementary particles.

For this purpose, it is based on another application of so-called scintillating fibres very diagrammatically illustrated in FIG. 2 relating to the detection of elementary particles. This drawing shows the only part of a known physical apparatus relating by analogy to the present invention. In this case, the impact of an elementary particle, indicated by arrow 7, on a scintillating plate 8 produces, by scintillation within the material of plate 8, a light emission which is trapped within the plate and, as a result of successive total reflections, reaches the lateral edges of the plate where it supplies a light signal. One edge of plate 8 is joined over its entire length to a scintillating optical fibre 9, which in turn is excited by said signal and said excitation leads to a second light signal being supplied at one end 10 of fibre 9. Thus, all the light signals corresponding to the passage of an elementary particle in the mass of the apparatus are collected.

Figure 3:
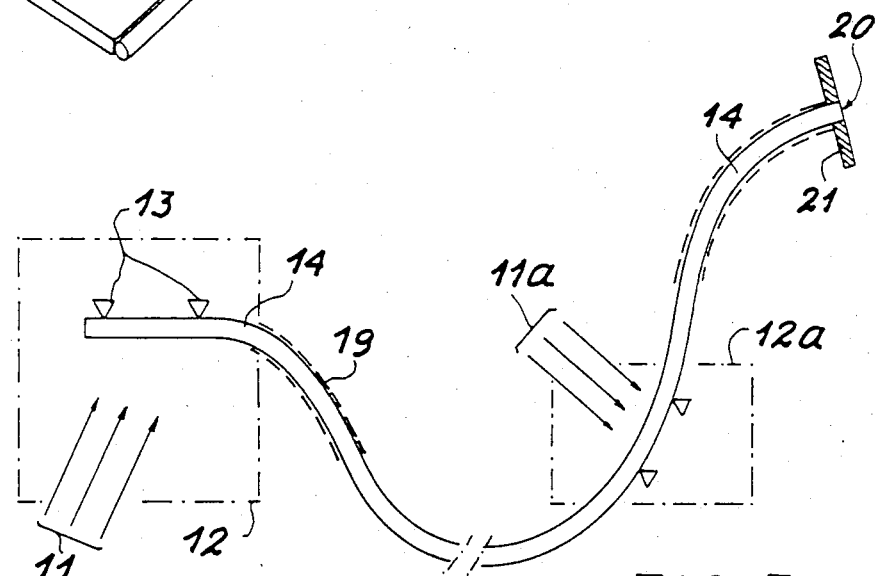
FIG. 3 A simple diagram showing the novel application according to the invention of a fluorescent fibre to the detection of light radiation.

FIG. 3 very diagrammatically illustrates the process according to the invention and relates to the utilization of light radiation, as in FIG. 1 and indicated by arrows 11. This radiation 11, when it exists, is assumed to have an action within useful space 12. The process of the invention consists of placing a fluorescent optical fibre 14 at a random point 13 within said useful space 12. In the present case, said random location 13 is diagrammatically indicated by support means of fibre 14, the latter being positioned at point 13 in such a way that it can be laterally excited by light radiation 11, in the same way as with the lateral excitation mode of the scintillating fibre of FIG. 2.

For most applications, the fluorescent optical fibre 14, which is surrounded outside useful space 12 by an opaque, mechanical protective sheet 19, will remotely transmit the light signal produced by the excitation due to the light radiation to one of its ends 20 which, according to the invention, is equipped with means for utilizing this signal and diagrammatically indicated by the hatched functional block 21. At 12a is shown a second useful space, where a second radiation 11a acts. In this case, the optical fibre functions as a logic OR circuit with respect to the operation of the two sources 11 and 11a. This manner of injecting light into a fluorescent optical fibre fundamentally differs from the previous mode of FIGS. 1 and 2 and offers the following advantages:

no accurate positioning of the light flux to be injected and the mere fact of placing a fluorescent fibre in the vicinity of a light source permits an intense excitation;

excitation is possible at any point over the path of the fibre so that, if desired, it is possible to summate the excitations of several sources or integrate the excitation of an extended flux over a considerable length;

it is possible to detect the presence of flux, provided that the fluorescent fibre is intercepted at a random point.

In summarizing, it can be said that a fluorescent fibre used according to the invention is really only an optical bus (by analogy with an electrical bus) characterized by its essential functions of collecting optical signals from a large number of sources, without any special light energy injection precautions and bringing about the addition of these optical signals.

It is opportune to point out here the principles and characteristics of the physical phenomenon of fluorescence.

Fluorescence is the phenomenon by which the material excited by light radiation of wavelength $\lambda_1$ retransmits or reemits isotropically a radiation of wavelengths $\lambda_2$ exceeding $\lambda_1$. The absorption and reemission bands are characteristics of the material used, as well as the fluorescence yield. The material in all its forms can be the seat of fluorescence, no matter whether it is gaseous (inert gases such as Kr, A or Ne), liquid (hydrocarbons, aromatic compounds) or solid (crystalline as with certain cerium glasses).

The present invention more particularly relates to the fluorescence of transparent plastics materials doped by fluorescent products with a high yield, thus forming solid solutions.

Optical fibres are now subject to extensive developments and are constituted by a central transparent part with a high refractive index, covered by a thin and also transparent layer with a lower index. Its function is to protect from various external influences the surface of the core, on which the inner light reflections will occur. In this way it is possible to bring about a transmission of optical messages over distances of several hundred metres without any significant attenuation.

The optical fibres with the best performance characteristics are made from glass or silica, but plastics fibres are also subject to rapid development as a result of the simplicity of production and their low cost.

In addition, plastics fibres have the great interest of being easily doped with scintillating or fluorescent materials, as stated hereinbefore. This is also possible, but is not as easy, in the case of silica or glass fibres, which are consequently usable for all the applications described hereinafter.

The operating principle of a light collector using fluorescent optical fibres is as follows. The fibre is exposed over its external surface to a radiation $E_1$ of mean wavelength $\lambda_1$. If the fluorescent agent with which it was doped has a matched absorption band [centered]on $\lambda_1$, the fibre core is excited and reemits in an isotropic manner light at a wavelength $\lambda_2$.

A part is lost and leaves the fibre, but a by no means negligible part is trapped within the fibre and is propagated by internal reflection to the end, where there is consequently a light flux of wavelength $\lambda_2$.

The process is integrally calculable and the following symbols are used:

D fibre length,
a fibre diameter,
$L_{ab}$ absorption length of core (at $\lambda_1$),
$L_{att}$ attenuation length of core (at $\lambda_2$),
n refractive index of core,
$n - \Delta n$ refractive index of sheath,
$g_e$ quantum efficiency of fluorescence.

It is therefore easy to demonstrate that for a fibre of length D subject to the illumination $E_1$ (at $\lambda_1$), the flux available at the two ends (at $\lambda_2$) is expressed by:

$$\phi = \underbrace{aL_{att}E_1}_{\alpha_1} \cdot \underbrace{(1 - e^{-\frac{a}{L_{ab}}})}_{\alpha_2} \cdot \underbrace{q_e}_{\alpha_3} \cdot \underbrace{\frac{\Delta n}{n}}_{\alpha_4} \cdot \underbrace{(1 - e^{-\frac{D}{L_{att}}})}_{\alpha_5}$$

in which the symbols have the following meanings:
 $\alpha_1$ all the flux collected,
 $\alpha_2$ the absorption level of the incident flux,
 $\alpha_3$ the efficiency of the reemission by fluorescence,
 $\alpha_4$ the efficiency of fluorescent light trapping,
 $\alpha_5$ a factor integrating the losses by transmission in the fibre.

On now considering the energy density available at the end of surface s of the fibre and on comparing it with the incident energy density $E_1$, it is possible to define a concentration factor K such that:

$$K = \frac{\phi}{SE_1} = \frac{4\phi}{\pi a^2 E_1} = \frac{4}{\pi} \cdot \frac{L_{att}}{a} \cdot (1 - e^{-\frac{a}{L_{ab}}}) \cdot q_e \cdot \frac{\Delta n}{n} \cdot (1 - e^{-\frac{D}{L_{att}}})$$

The typical values of the different parameters for the known fibres produced by the applicant are:

$-L_{att} = 1000$ mm   $a = 1$ mm $-1 - e^{-\frac{a}{L_{ab}}} = .8$   $q_e = .8$ $-1 - e^{-\frac{L}{L_{att}}} = .86$   $\frac{\Delta n}{n} = 8.5\%$ (for $D = 2L_{att} = 2$ m) leading to: $K \approx 60$ Thus, in summarizing a 2 m long, 1 mm diameter fibre like those produced by the applicant, would concentrate the flux absorbed by it round the wavelength $\lambda_1$ by a factor of 60 at each of its ends by means of a spectral shift $\lambda_1 \rightarrow \lambda_2$.

It is pointed out that the factor dominating the amplification is the ratio $L_{att}/a$, hence the interest of small diameter fibres (provided that the transparency properties are retained and that there is a satisfactory absorption of the incident flux) and as will be shown hereinafter it is possible to conceive cascade structures, where it is possible to benefit from the concentration in each stage.

A first and the most simple application of the process according to the invention is diagrammatically illustrated in FIG. 4. It relates to the control on the basis of a single instrument panel of the operating state of the different light sources located at separate locations. This can be the control of the illumination of the parts of a group of parts, or of the control of the satisfactory operation of light sources equipping a car.

Thus, this first application of the invention only uses a light radiation detection function and optionally the detection in parallel of several separate light radiations.

In this case, the six useful spaces 12.1, 12.2,... 12.6, possibly subject to the light radiation of several different lights or lamps 11.1, 11.2,... 11.6 (roof lights, headlights, dip lights, side lights, rear lights and stop lights) will be equipped with laterally excitable fluorescent optical fibres. These fibres 14-19.1, 14-19.2,... 14-19.6 will be joined by their ends 20.1, 20.2,... 20.6 to the instrument panel, where there will be a synoptic indication of the operation or non-operation of these different lights.

In order to increase the brightness of the end indication face of the fluorescent optical fibre, a coating serving as a mirror will be applied to the other unused fibre end.

A second application of the process according to the invention aims at providing a very bright point light source from a remotely positioned, not very bright point source. This application is diagrammatically shown in FIG. 5. In this case, use is made of the light radiation emitted by a conventional, not very bright, incandescent lamp 11.7. According to the invention, the latter is completely surrounded by a winding 22 of a fluorescent optical fibre 14.7 with adjacent turns. To simplify the diagram of FIG. 5, the fibre 14.7 around lamp 11.7 is indicated by a single line. The two joined strands 14-19.7 of said fibre are remotely introduced into a support 21 which, supplied in this way, constitutes a very bright point light source by the output end 20.7 of said fibre.

This second application of the invention implements a collection and concentration function of the maximum of the light emitted by a light source with a non-parallel flux.

FIG. 6 illustrates the same application, but using the light radiation emitted by a fluorescent tube. The same reference numerals in FIGS. 5 and 6 represent identical or similar elements.

This collection function permits a relatively high efficiency, which can be close to 20% collection of the light radiation emitted by the initial light source, with neither [centering]nor precise positioning of winding 22 relative to source 11.7.

A third application of the invention relates to the collection and concentration of light radiation with the aid of devices using the process according to the invention, but has a parallel connection of the fluorescent optical fibres to form panels.

Figure 7:
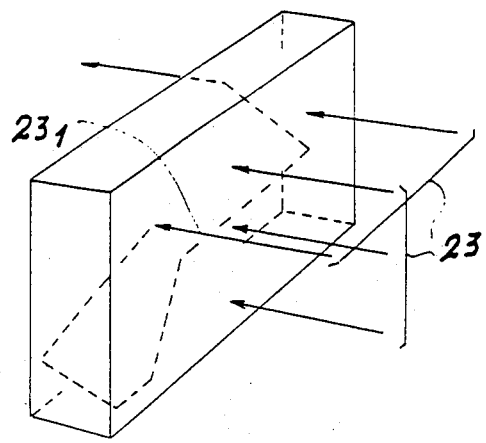
FIG. 7 The prior art of utilizing solar radiation.

FIG. 7 illustrates the prior art closest to this application. It illustrates the known process consisting of exposing a thick plate of a transparent material (mineral or organic glass), doped with the aid of an appropriate fluorescent product to solar radiation indicated by the two sets of orthogonal arrows 23. Part of the flux is absorbed and then isotropically reemitted by fluorescence.

A fraction of the reemitted light energy is confined within the plate and is propagated by internal reflections up to the edges, where it is available for sensors or transducers of e.g. the photovoltaic cell type and as indicated by the ray line 23.

The theoretical interest of the device is based on the absence of any system of orienting towards the sun, as well as the possibility of operating with diffuse illumination (cloudy sky). There is also a concentration of energy collected by the large faces of the sensor on the edges of the small surface.

This possibility of collecting and concentrating solar energy by means of fluorescent plates has been known for about 15 years. Several scientific publications mention this idea. However, the practical realization has come up against two major problems, one being the stability of the fluorescent products used and particularly their deterioration under the influence of incident radiation and the second is the efficiency of the transfer of the light energy remitted by fluorescence up to the edges of the plate. The use of optical fibres does not solve the first problem (although significant advances have been made recently in connection with the stability of dyes). However, the process according to the invention helps to solve the second problem.

Figure 8:
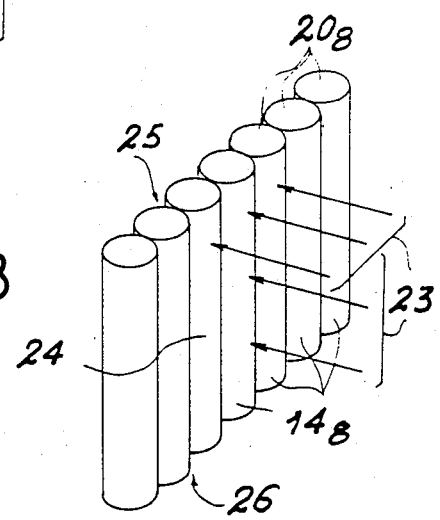
FIG. 8 The improvement to said art according to the invention.

This novel application is diagrammatically illustrated in FIG. 8. In this case, a parallel light radiation, such as solar radiation, indicated by two sets of orthogonal arrows 23, laterally strikes a set of six fluorescent optical fibres 14.8 joined to one another by generatrixes contained in the same plane. The light laterally entering these fibres is channelled to the ends 20.8 of the joined fibres and the reflections within the material are less numerous than in the case of FIG. 7 and with a coefficient close to 100%.

Figure 9:
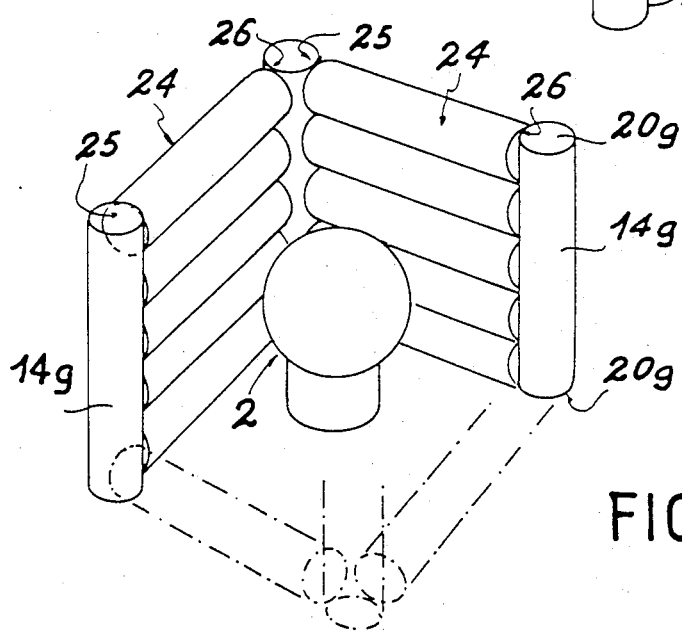
FIG. 9 The realization of fibre devices according to the invention in the form of panels with collection of concentrated light at the edges of said panels by other fluorescent optical fibres.

Thus, according to FIG. 8, there is an elementary panel 24 of joined fluorescent optical fibres making it possible to supply on its upper and lower edges 25, 26 respectively, concentrated light signals resulting from the collection and concentration of the incident light fluxes 23. Such panels make it possible to connect in cascade two light flux collection and concentration stages, as is shown by FIG. 9 relative to yet another application of the inventive process. FIG. 9 shows in perspective view an incandescent lamp 2 enclosed in a box constituted by four panels 24 of fluorescent optical fibres of the type shown in FIG. 8, whereof only two are specifically shown. Panels 24 collect and concentrate the flux emitted by lamp 2 on their edges 25 and 26. Vertical fluorescent optical fibres 14.9 are located at the four joining edges of the four panels 24 and in turn collect in a second stage the light signals available on edges 25, 26 and concentrate them at their ends 20.9.

If, as is usually the case, source 2 is polychromatic, the thus formed box will permit the passage of the fraction of the spectrum emitted by the lamp and which is not absorbed by the fluorescent optical fibres of panels 24. Thus, the apparatus of FIG. 9 constitutes an apparently conventional luminaire, but which also supplies a high concentration of the light absorbed by the fibres of the panels on four auxiliary channels constituted by the four vertical optical fibres 14.9.

Figure 10:
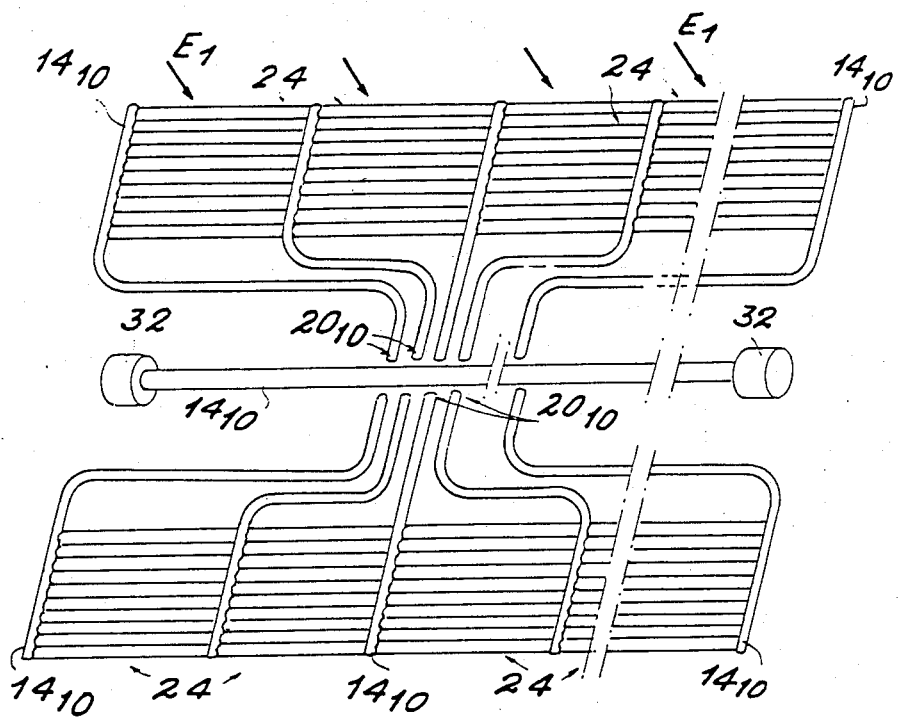
FIG. 10 A solar collector for the direct supply of electricity.

Yet another application of the invention relates to a multistage collection and concentration of parallel light fluxes, such as solar radiation. FIG. 10 illustrates this in perspective. The incident solar flux $E_1$ strikes the planar apparatus, placed on the ground, of FIG. 10. This apparatus comprises panels 24 formed from joined fluorescent optical fibres, like those of FIG. 8, and the ends of these panels excite the fibres 14.10 positioned facing said ends and whose ends 20.10 are joined in linear manner so as to face a terminal fibre 14.10.1 providing a third collection - concentration stage, identical to that of FIG. 9.

Symmetrically with respect to the terminal fibre 14.10.1, the apparatus can have another set of panels and fibres identical to those described hereinbefore. The output ends of the terminal fibre 14.10.1 can be connected to converters, such as photovoltaic cells 32 for directly obtaining electricity. An apparatus of the type shown in FIG. 10 can be installed on the roof of dwellings.

Another application of the invention relates to an apparatus for detecting holes in large bands placing in front of a transverse band control line. According to the prior art, along said line is placed one or more light sources obscured by the band. On the other side of the light sources with respect to the band is positioned a row of light detectors, such as photodiodes, whose field only extends over a few millimetres. This prior art is not really suitable for controlling large band widths, because it involves a large number of photodiodes.

Figure 11:
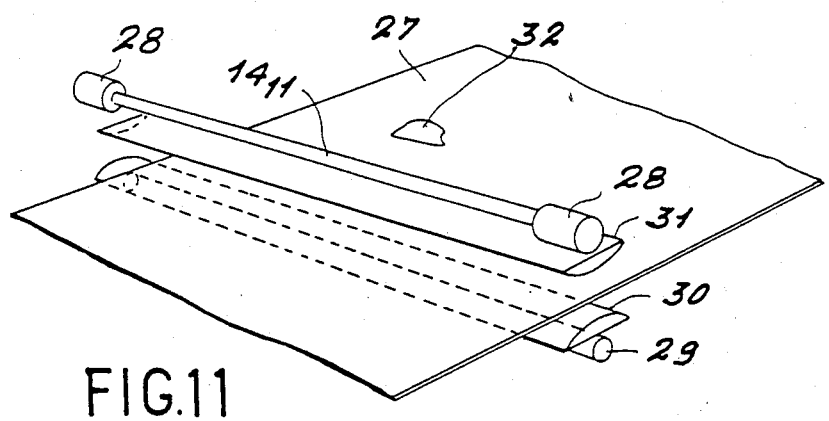
FIG. 11 A control apparatus utilizing the light variations received by a fluorescent optical fibre used according to the invention.

According to the invention, it is proposed that said prior art means be substituted by a much simpler apparatus, whose diagram is shown in FIG. 11. This apparatus is provided transversely with respect to the band 27 to be controlled with a fluorescent optical fibre 14.11, whose two ends are connected to two photodiodes 28. On the other side of said fibre 14.11 with respect to band 27 is arranged a linear light source, such as a fluorescent tube 29. Optionally simple optics 30, 31 focus and concentrate respectively the light fluxes emitted by tube 29 and received by fibre 14.11.

When a fault, i.e. a hole is detected by the passage of the light of tube 29 to fibre 14.11 when said hole is located between lamp 29 and the fluorescent optical fibre 14.11, the signals received by the diodes 28 can be processed to define the location and size of said faults.

It is finally pointed out that a fluorescent optical fibre has clearly defined absorption and reemission spectra. Thus, according to the invention the realization of the aforementioned process for certain applications also ensures a spectrum selection function, like that mentioned for the luminaire of FIG. 9.

Although it is possible to use for the purposes of the invention any random fluorescent optical fibre made from glass, silica, or various plastics materials, mixed with appropriate fluorescent products, preference is given to fibres made from plastics materials. For example, fibres will be used having a core of polystyrene or polymethyl methacrylate, the latter being known as PMMA.

According to a first type of fibre, this base will be mixed to 100 mg/l with bis-MSB whose formula is:

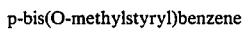

p-bis(O-methylstyryl)benzene

The absorption wavelength of this fibre doped in this way is 350 nm in the near ultraviolet and its reemission wavelength is 420 nm in the blue.

According to a second type of fibre, said base will be mixed to 10 mg/l with six-coumarin, whose formula is:

3-(2'benzothiazolyl)-7-N,N-diethylaminocoumarin

The absorption wavelength of the thus doped fibre is 460 nm in the blue-green and its reemission wavelength is 540 nm in the green-yellow.

According to a third type of fibre, the base is mixed to 10 mg/l with Rhodamine 6G whose formula is:

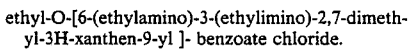

ethyl-O-[6-(ethylamino)-3-(ethylimino)-2,7-dimethyl-3H-xanthen-9-yl ]- benzoate chloride.

The absorption wavelength of the thus doped fibre is 530 nm in the green and its reemission wavelength is 585 nm in the red.

The invention is obviously not limited to the applications given in a purely exemplified manner hereinbefore.

What is claimed is:

1. A process for the utilization of at least one source of light radiation in at least one space traversed by the light radiation comprising:

providing at least one fluorescent optical fibre having a transparent core and sheath, and having two ends;

placing in the space part of the fluorescent fibre in a position such that the fluorescent fibre can be laterally excited by the light radiation such that a light signal is produced by fluorescence within the fibre and conveyed to the ends; and positioning a functional element at least one end of the fibre for utilization of the light signal corresponding to lateral excitation of the fibre; and wherein the laterally excitable fibre part can be exposed to the flux of a single point source and wherein the end of the fibre ensures a binary function of indicating the operating or non-operating state of said source.

2. An apparatus for performing the process according to claim 1 carrying out the indication of the state of operation or non-operation of at least one radiation source, wherein the means associated with the fibre end is indication means mounted on an instrument panel.

3. An indicating apparatus according to claim 2, wherein the other end of the fibre is provided with a coating acting as a mirror.

* * * * *